Dec. 26, 1933.                T. J. DIAMOND                1,940,666
                              BATTERY TERMINAL
                           Filed Sept. 19, 1931
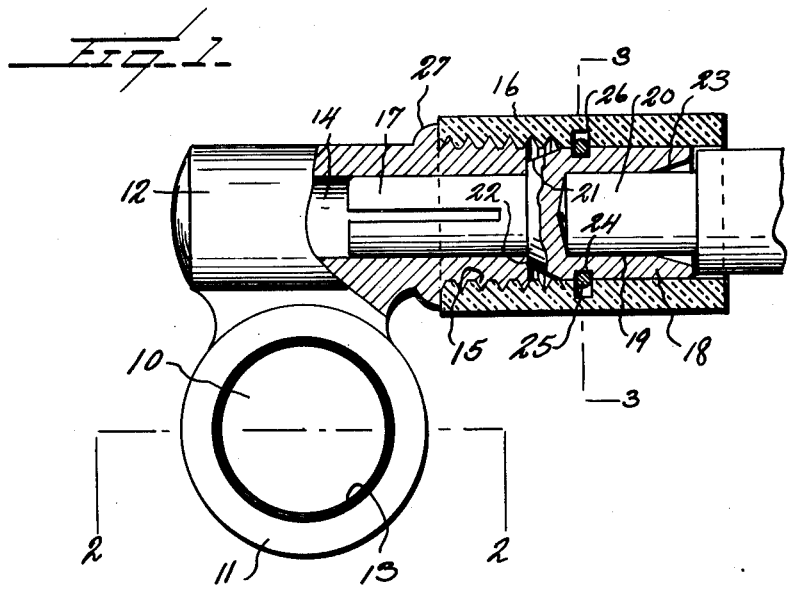
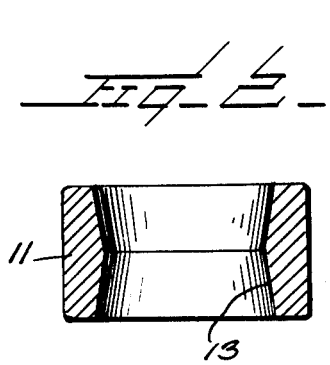
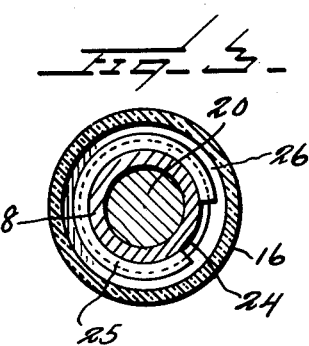
Inventor
T. J. Diamond
By Watson E. Coleman
Attorney Patented Dec. 26, 1933

1,940,666

UNITED STATES PATENT OFFICE 1,940,666

BATTERY TERMINAL

Thomas J. Diamond, Denver, Colo.

Application September 19, 1931
Serial No. 563,827

4 Claims. (Cl. 173—259)

This invention relates to battery terminals, and is an improvement of the battery terminal construction disclosed in my abandoned application filed February 6, 1930, Serial No. 426,384.

An object of this invention is to provide a terminal which can be readily and cheaply manufactured by means of which the battery cable can be securely attached to the terminal mounting and when so attached will not be subjected to corrosion or the like.

Another object of this invention is to provide a removable cable mounting for a battery terminal so that the terminal mounting may be fixedly secured to the battery post as by soldering, crimping or the like, while permitting the removal of the cable from the terminal mounting.

The above and various other objects and advantages of this invention will in part be described in and in part be understood from the following detailed description of the present preferred embodiment, the same being illustrated in the accompanying drawing, wherein:—

Figure 1 is a detail top plan view partly in section of a device constructed according to the preferred embodiment of this invention;

Figure 2 is a sectional view taken on the line 2—2 of Figure 1, and

Figure 3 is a sectional view taken on the line 3—3 of Figure 1.

Referring to the drawing wherein like numerals of reference designate corresponding parts throughout the several views, the numeral 10 designates generally a battery terminal post of conventional construction which tapers upwardly, and the numeral 11 designates a terminal ring disposed about the periphery of the battery post 10. This ring 11 has the inner wall thereof of tapering construction, as indicated at 13, so as to permit the mounting of the ring 11 on the terminal post 10 in either right or left hand position. By constructing the ring 13 with the inner wall thereof tapering inwardly from the top and bottom thereof, it is also easier to cast the ring 11 in a suitable mold.

A lug 12 is formed with the ring 11 and extends tangentially of the ring 11 and is provided with an axially disposed bore 14 therein. One end of the lug 12 is provided with peripheral threads 15 for threadably receiving an insulating sleeve 16 which is threaded at one end thereof. Disposed within the bore 14, there is an elongated split stud 17 having a ferrule 18 formed at the outer end thereof, which ferrule 18 is relatively larger in diameter than the stud 17. This ferrule 18 has a bore 19 therein for receiving an end portion 20 of a battery cable which may be either soldered or crimped within the bore 19. The inner end of the ferrule 18 has a tapering portion 21 which terminates in a shoulder 22 engaging against the inner end of the lug 12. This ferrule 18 is also tapered inwardly at the outer end thereof, as at 23, so as to facilitate the insertion of the bar end 20 of the battery cable within the ferrule 18.

This ferrule 18 is also provided with a peripheral groove 24 intermediate each end thereof within which a split resilient securing ring 25 is adapted to loosely engage. The insulating sleeve 16 is also provided intermediate its ends with a groove 26 for receiving a portion of the securing ring 25, so that when the ring 25 is engaged in the groove 24 and in the groove 26, the ferrule 18 will be swivelly mounted within the sleeve 16. The lug 12 is also provided at the inner end of the threads 15 with an annular rib 27, which serves as a stop for the sleeve 16. The sleeve 16 may be constructed of relatively hard rubber, composition or the like, which is preferably not subject to corrosion and the lug ring 11, together with the lug 12, are preferably constructed of relatively soft metal such as lead, composition or the like. The cable securing member comprising the stud 17 and the ferrule 18 is preferably constructed of metal relatively harder than the lug proper, so that the split stud 17 will have inherent resiliency and will resiliently engage the wall of the bore 14 when the stud 17 is mounted therein.

In the use of this device, the terminal lug comprising the ring 11 and the lug 12 may be fixedly secured to the terminal post 10 as by soldering, crimping or the like. The bare end portion 20 of the battery cable may be either soldered, crimped or otherwise fixedly secured in the ferrule 18, whereupon the securing ring 25 is slipped into the sleeve 16 until it engages in the groove 26 within which groove the ring 25 is loosely positioned.

The cable securing member comprised of the stud 17 and the ferrule 18 may then be forced through the sleeve 16 until the inclined edge portion 21 engages the ring 25, whereupon the further movement of the cable attaching or securing member will force the split ring 25 apart and when the ring 25 seats in the peripheral groove 24, the cable attaching member will be prevented from further longitudinal movement within the sleeve 16. While the cable attaching member will be held against longitudinal movement with respect to the sleeve 16, this sleeve 16 is nevertheless rotatably held on the cable attaching member, so that the sleeve 16 may be threadably engaged with the threads 15 of the lug 12. In this manner, when the sleeve 16 is tightened on the lug 12, the cable 20 will be detachably engaged with the lug 12, and at the same time, the cable 20 will be protected against any corrosion formed about the battery terminal post 10. Through the provision of the tapering construction of the ring 11, the terminal lug may be mounted with either end portion of the ring 11 uppermost, so that the lug 12 may be positioned in the desired place or position with respect to the battery. In this manner, the terminal lug is made reversible so that it can be used for either right or left hand terminal posts.

It is, of course, understood that various changes and modifications may be made in the details of construction and design of the above specifically described embodiment of this invention without departing from the spirit thereof, such changes and modifications being restricted only by the scope of the following claims.

I claim:—

1. A battery terminal of the character described comprising a ring, a lug formed with the ring and having a bore therein, a cable engaging member having a portion thereof disposed in said bore, and means swivelly carried by said cable engaging member for detachably securing said cable engaging member in said bore, said means comprising a threaded sleeve having an annular groove, and a resilient ring loosely carried by the member and engaging in the groove.

2. A reversible battery terminal of the character described comprising a ring having the inner surface thereof tapering inwardly from each end of the ring, a lug tangentially carried by the ring and having a bore therein, a cable engaging member comprising a ferrule and an elongated split stud carried by one end of the ferrule, said stud engaging in the bore of said lug, an insulating sleeve disposed about the ferrule, and means for rotatably mounting the sleeve on said ferrule while holding the sleeve against movement longitudinally of the ferrule.

3. In a battery terminal of the character described, a ferrule adapted to receive an end portion of a battery cable, an elongated reduced stud extending axially from one end of said ferrule, said ferrule having the end portion adjacent said stud tapering and being provided with a peripheral groove inwardly f each end thereof, an elongated insulating sleeve loosely engaging about said ferrule, said sleeve having an annular groove therein disposed inwardly of each end, and a resilient securing member loosely seating in the groove of said ferrule and the groove of said sleeve whereby to swivelly mount the sleeve on the ferrule.

4. A battery terminal lug having a socket, a ferrule having a bore to receive an end of a cable, a longitudinally split stud extending from one end of the ferrule for insertion in said socket, and a non-corrosive protector secured to the ferrule and extending beyond the ends of the ferrule for the reception of portions of the cable and lug.

THOMAS J. DIAMOND.